(12) United States Patent
Van Doorn et al.

(10) Patent No.: US 9,862,035 B2
(45) Date of Patent: Jan. 9, 2018

(54) GUIDE PAD AND A CUTTER HEAD FOR A CUTTING TOOL

(71) Applicant: SANDVIK INTELLECTUAL PROPERTY AB, Sandviken (SE)

(72) Inventors: Eva Van Doorn, Gavle (SE); Per Hansson, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/515,458

(22) Filed: Oct. 15, 2014

(65) Prior Publication Data
US 2015/0104267 A1 Apr. 16, 2015

(30) Foreign Application Priority Data
Oct. 16, 2013 (EP) .................................. 13 188 908

(51) Int. Cl.
*B23B 51/02* (2006.01)
*B23B 51/04* (2006.01)

(52) U.S. Cl.
CPC .......... *B23B 51/02* (2013.01); *B23B 51/0493* (2013.01); *B23B 2200/08* (2013.01); *B23B 2251/50* (2013.01); *B23B 2251/56* (2013.01); *Y10T 408/5586* (2015.01); *Y10T 408/9098* (2015.01)

(58) Field of Classification Search
CPC . B23B 51/02; B23B 51/0493; B23B 2251/56; Y10T 279/5586
See application file for complete search history.

(56) References Cited

U.S. PATENT DOCUMENTS

| 6,602,028 B1* | 8/2003 | Lindblom ............. B23B 51/048 175/399 |
| 6,682,275 B1* | 1/2004 | Lindblom ............. B23B 51/048 408/59 |
| 8,696,269 B2* | 4/2014 | Danielsson ......... B23B 51/0486 408/200 |
| 8,992,138 B2* | 3/2015 | Hecht ..................... B23B 51/00 408/83 |
| 2010/0061817 A1* | 3/2010 | Nomura ............. B23B 51/0493 408/83 |
| 2010/0104385 A1* | 4/2010 | Nomura ............. B23B 51/0493 408/83 |
| 2012/0315102 A1* | 12/2012 | Hecht ..................... B23B 51/00 408/227 |

(Continued)

FOREIGN PATENT DOCUMENTS

| CN | 1156981 A | 8/1997 |
| CN | 1974089 A | 6/2007 |

(Continued)

*Primary Examiner* — Eric A Gates
(74) *Attorney, Agent, or Firm* — Corinne R. Gorski

(57) ABSTRACT

A guide pad for a cutting tool is formed with at least one sliding surface, which is convexly curved in a plane perpendicular to a longitudinal axis of the guide pad. Each sliding surface includes two convexly curved sliding sub-surfaces separated by a fluid conveying formation having a longitudinal extension in a direction in parallel to the longitudinal axis. The fluid conveying formation is planar or has a convexly curved shape in a direction perpendicular to the longitudinal axis having a larger radius of curvature than the radius of the sliding surface.

12 Claims, 6 Drawing Sheets

(56) References Cited

U.S. PATENT DOCUMENTS

2013/0051944 A1    2/2013  Wenzelburger et al.

FOREIGN PATENT DOCUMENTS

| CN | 101318233 A | | 12/2008 |
|---|---|---|---|
| CN | 101652212 A | | 2/2010 |
| CN | 101663119 A | | 3/2010 |
| JP | 2006239827 A | * | 9/2006 |
| JP | 4768998 B2 | | 9/2011 |

* cited by examiner

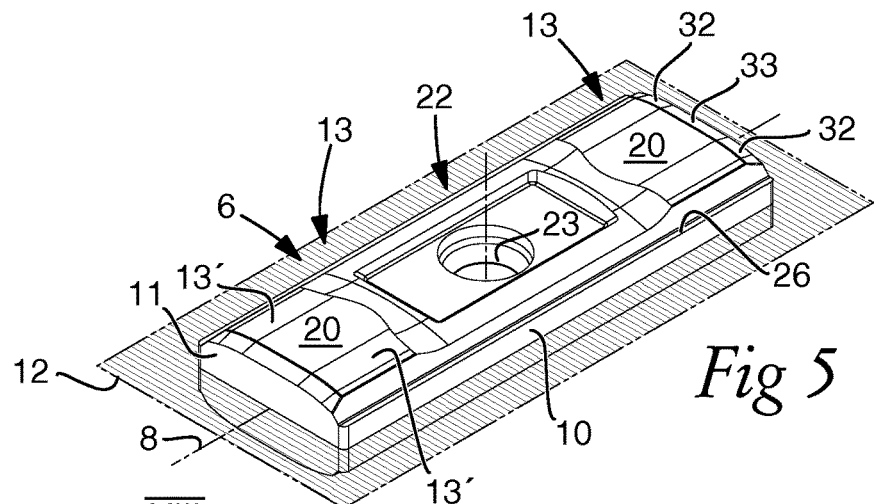
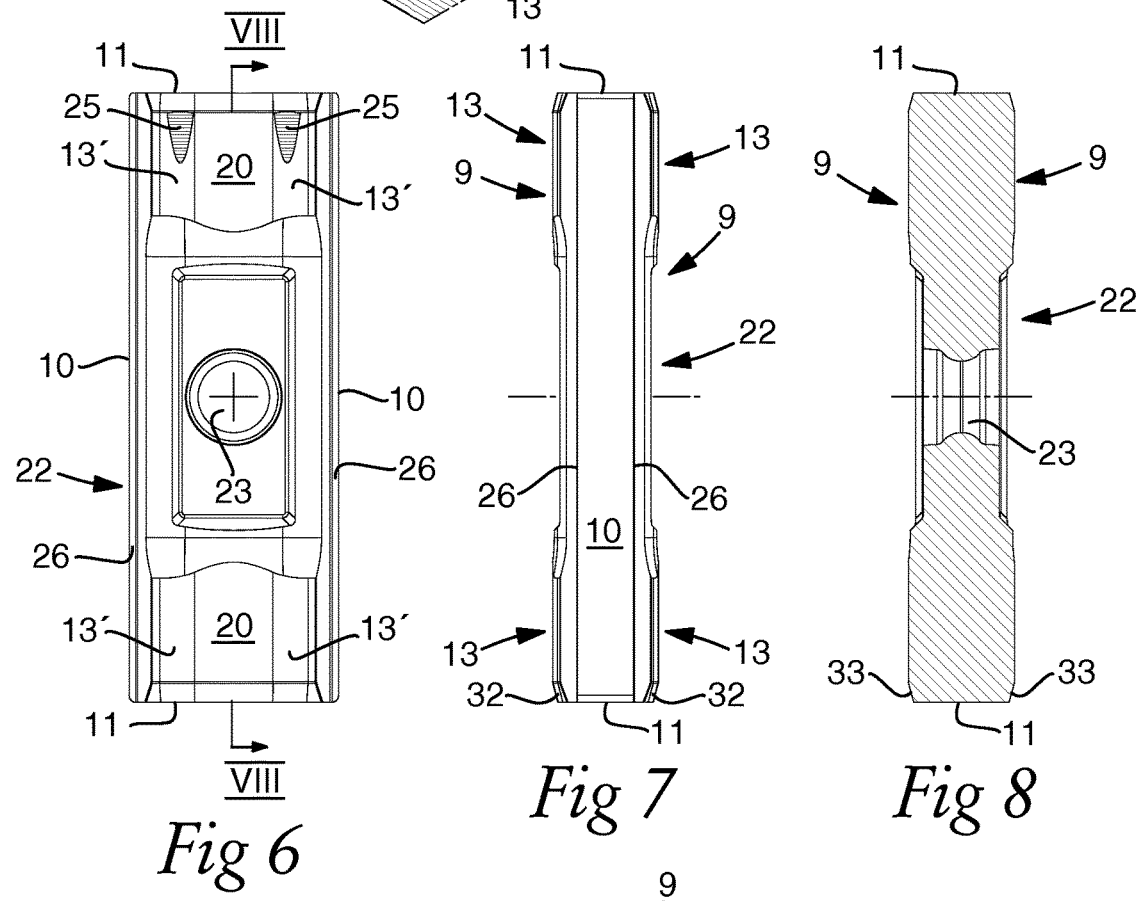
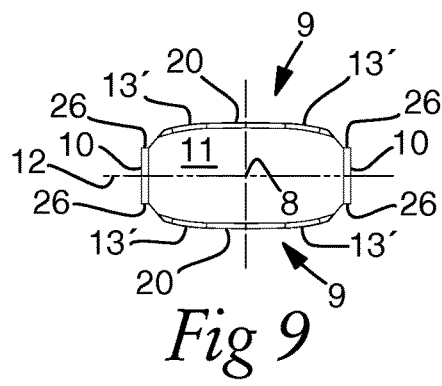

GUIDE PAD AND A CUTTER HEAD FOR A CUTTING TOOL

RELATED APPLICATION DATA

This application claims priority under 35 U.S.C. §119 to EP Patent Application No. 13188908.1, filed on Oct. 16, 2013, which the entirety thereof is incorporated herein by reference.

TECHNICAL FIELD

The present disclosure relates to a guide pad for a cutting tool, the guide pad being formed with at least one sliding surface, which is convexly curved as viewed in a plane perpendicular to a longitudinal axis of the guide pad, each sliding surface including two convexly curved sliding sub-surfaces separated by a fluid conveying formation having a longitudinal extension in a direction in parallel to the longitudinal axis. The present disclosure also relates to a cutter head comprising such a guide pad.

BACKGROUND

Guide pads are used during cutting machining in metals and other hard materials on, e.g., cutter heads of deep hole drilling tools in order to prevent wear of the cutter head and to guide the drilling tool during the drilling process and thereby maintain the cutter head along a straight axis line to create a bore hole which is straight with an as high accuracy as possible. For this purpose at least two guide pads are mounted in a respective seating on an outer periphery or envelope surface of the cutter head by means of e.g. screwing, clamping or soldering. A sliding surface of the guide pad which is facing outwards and bears against the circumferential bore hole, is normally formed with a part-circular cross section having the same or a somewhat smaller radius of curvature as the radius of the bore hole.

During the drilling process, the guide pad is exposed to high temperatures due to friction against the hole wall, which in combination with high pressure against the hole wall, makes the guide pads subject to wear and formation of cracks. In order to reduce the tendency of wear and crack formation, it is common practice to provide a cooling and lubricating fluid, which is fed through channels within the drilling tool into the bore hole. However, the cooling/lubricating fluid can often not, to a sufficient extent, reach the entire contact zone between the guide pad and the hole wall, which makes the cooling/lubricating insufficient, such that the wearing of and formation of cracks will still be considerable.

US 2013/0051944 discloses various guide pads, which in the embodiments according to FIGS. 5 to 8 are provided with multiple lubricating grooves in different patterns in the sliding surface. This will improve the cooling and lubricating of the contact zones between the guide pad and the hole wall since the cooling/lubricating fluid easier can be fed to each contact zone. However, unfortunately the lubricating grooves will also form fractural impressions or stress concentrations, which in its turn will promote the formation of cracks.

SUMMARY

An aspect of the present disclosure is to provide a guide pad for a cutting tool having a fluid conveying formation in the sliding surface, wherein the fluid conveying formation does not weaken the guide pad.

Accordingly, this aspect may be achieved by forming the fluid conveying formation as a planar surface or a convexly curved surface having a larger radius of curvature than the sliding surface, wherein the fluid conveying formation extends in the middle and in parallel to the longitudinal axis of the guide pad and is formed as a bevelling of the sliding surface of the guide pad such that the sliding surface is divided into two sliding sub-surfaces. The fluid conveying formation is smoothly merged with the sliding sub-surfaces without forming stress raising grooves.

Smoothly merged in this context means that the angle between the planar or slightly convexly curved surface of the fluid conveying formation and each of the sliding sub-surfaces at their transition can vary between 90-180°, and between 135-175°. The transition itself can be a rather sharp edge. In this way the fluid conveying formation will not form a weakening and stress raiser to the same extent as if the fluid conveying formation is formed as a groove, at the same time as the fluid conveying capacity can be made sufficiently large in order to supply the contact surfaces at the sliding sub-surfaces, which during machining will be in contact with the material to be machined, with sufficient amounts of cooling and lubricating fluid.

As an alternative embodiment, the transition between the fluid conveying formation and each sliding sub-surface could be made additionally rounded-out. However, normally is preferred that the edge is made distinct and well defined by just machining the fluid conveying surface into the guide pad for the sake of simplified manufacturing. On the other hand, an advantage with a rounded edge is that cooling fluid more easily can flow from the fluid conveying surface to the sliding sub-surfaces and thus enhancing cooling.

The fluid conveying formation can either be formed as a planar surface or as a convexly curved surface having a larger radius of curvature in relation to the sliding surface. An advantage with a planar fluid conveying formation is that it can be formed in a very simple and cost saving way. An advantage with a convexly curved fluid conveying formation is that it weakens the guide pad to an even less extent than a planar fluid conveying formation. In addition, a guide pad with a planar fluid conveying surface can be produced with a smaller width as compared to a guide having a convexly curved fluid conveying formation and still have the same fluid conveying capability. Moreover, a planar fluid conveying formation is somewhat easier, and hence less expensive, to produce than a convexly curved planar fluid conveying formation.

Within this overall inventive idea, it should be appreciated that the guide pad of the present disclosure can be formed or designed in many different ways. In the hereinafter described and illustrated embodiments of the invention, the guide pad is indexable four times, i.e. it has four sliding surfaces or totally eight sliding sub-surfaces, which in sequence can be positioned in an active position for sliding against the hole wall and guiding of the drilling tool. This is accomplished in that the guide pad includes two opposite main surfaces, each having two sliding surfaces, i.e. altogether four sliding sub-surfaces per main surface, wherein there is one sliding surface in each end portion in relation to the longitudinal axis of the guide pad. By rotating the guide pad optionally in the median plane or around the longitudinal axis, it is accordingly possible to place an arbitrary of the sliding surfaces in position for sliding and bearing against the hole wall. However, it is to be understood that the guide pad also could be provided with only two sliding surfaces on only one of the main surfaces or even only one single sliding surface.

In the following embodiments, the sliding surfaces of the guide pad are illustrated as having the same radius of curvature as the bore hole. However, the sliding surfaces can also have a radius that is less than the curvature of the bore hole. However, the sliding surfaces should not have a radius of curvature that is larger than the radius of curvature of the bore hole, because that would lead to the sliding surfaces bearing against the hole wall with only their outer corner points, which would lead to a rapid wear of the guide pad and possible scratching of the hole wall. In fact, the sliding surfaces need not be formed with a part-circular curvature, instead they could be curved in any other suitably way, and the individual sliding sub-surfaces need not even have the same curvature or the same center of curvature.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIGS. 5-9 are perspective views: a view from above of a main surface, a side view, a longitudinal cross-section and an end view, respectively, of a first embodiment of a guide pad according to the present disclosure.

DETAILED DESCRIPTION

Figure 1:
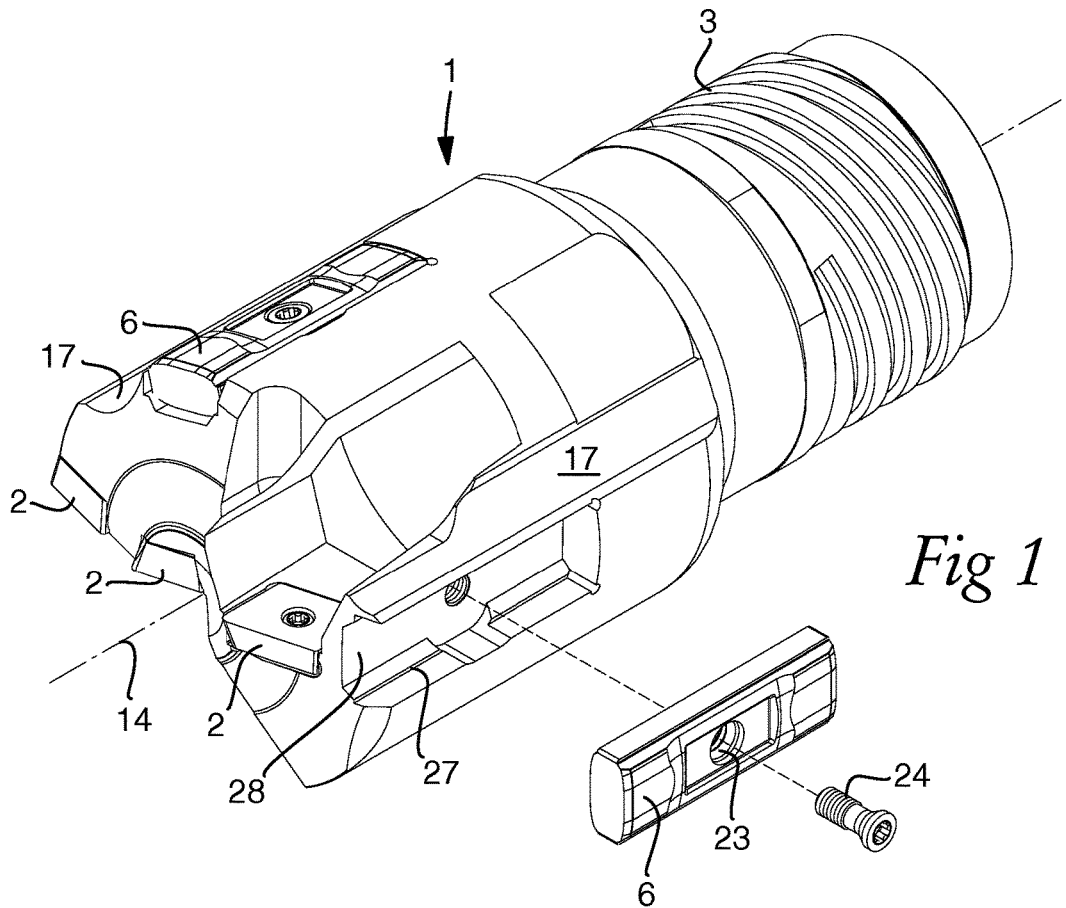
FIG. 1 is a perspective view of a cutting tool in form of a cutter head for deep hole drilling, which is provided with two guide pads according, one of which is shown detached from the cutter head.
Figure 2:
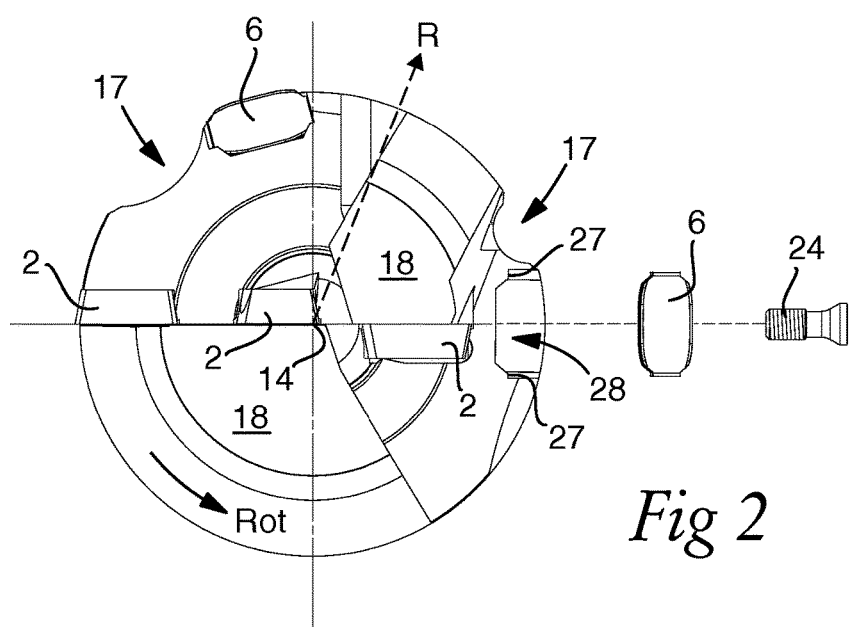
FIG. 2 is a front view of the cutter head according to FIG. 1.

Reference is first made to FIGS. 1 and 2, which illustrate a cutting tool in form of a cutter head 1 for a drilling tool in a perspective view and a front view, respectively. The cutter head is in a front end provided with cutting inserts 2 and in a rear end with an external thread 3. The cutter head is by means of the external thread adapted to be attached to a drill tube (not shown), which can be carried by a suitable supporting device.

Figure 3:
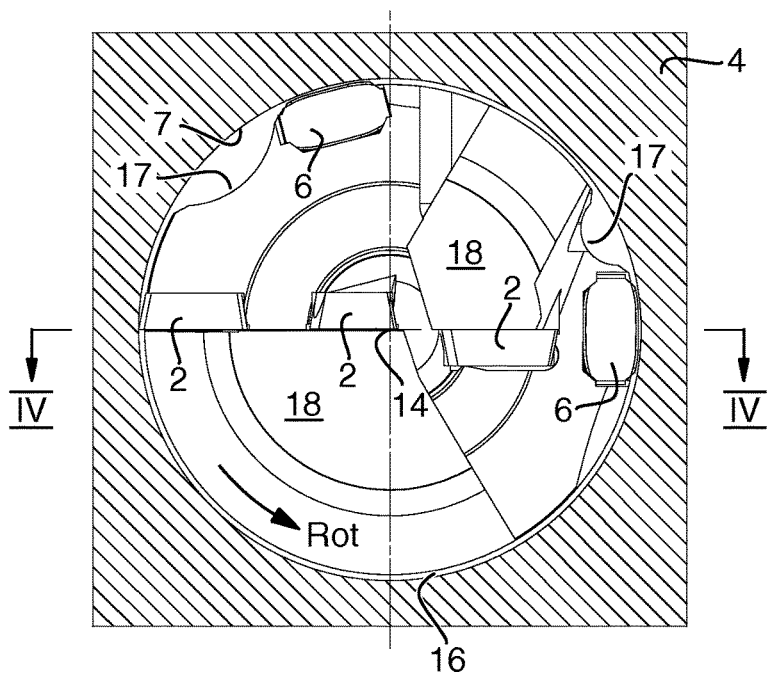
FIG. 3 is a cross-section through a work piece and a bore hole being drilled by means of a cutter head according to FIGS. 1 and 2.

As seen in FIGS. 2 and 3, of which the latter shows a cross section through a work piece 4 and the front end of the cutter head 1 during drilling, the cutter head includes three cutting inserts 2, which are positioned such that their respective cutting edges are positioned along a straight line through a rotational axis 14 of the cutter head, with two cutting inserts positioned mainly on one side of the rotational axis and one on the other side facing in the opposite direction. During rotation of the cutter head in relation to the work piece in the direction of an arrow Rot, the cutting inserts 2 will cut and remove borings or chips from the work piece such that a bore hole 5 is formed in the work piece. The arrangement of the cutting inserts with two cutting inserts on one side of the rotational axis and the other cutting insert on the other side and facing in the opposite direction, will have to effect that the cutter head will be actuated by a resultant force directed approximately as is illustrated by an arrow R (c.f. FIG. 2). In order to balance and take up the resultant force R, a guide pad 6 is positioned on each side of the resultant force R and carefully mounted such that an outer, forward contact surface of each guide pad will bear and slide against the inner surface of the hole wall 7.

In this way, it is ensured that the cutter head will not wear against the hole wall. Instead, the small, indexable and exchangeable guide pads 6 will be subjected to essentially all wearing against the hole wall and they also guide and center the cutter head and ensure that the cutter head follows a straight line during drilling.

Figure 4:
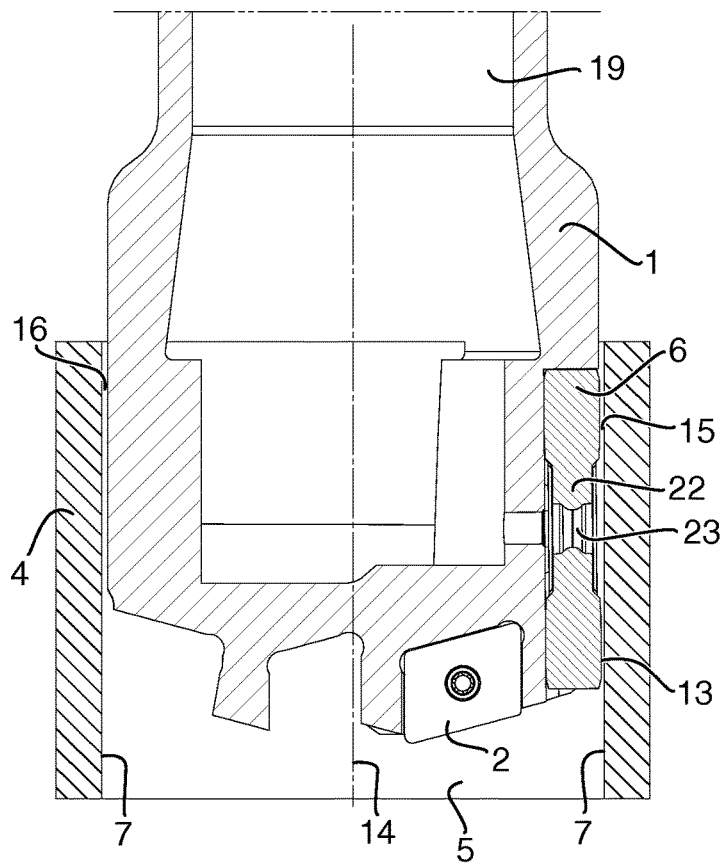
FIG. 4 is a longitudinal cross-section along the line IV-IV in FIG. 3.

FIGS. 5-9 illustrate in detail the design of an embodiment of a guide pad 6. The guide pad is generally formed as a parallelepiped, which has a longitudinal axis 8 and comprises two opposite main surfaces 9, two opposite longitudinal side surfaces 10 and two opposite end surfaces 11. The illustrated guide pad is symmetric in relation to a median plane 12 and is indexable four times, i.e. it has four sliding surfaces 13, two on each main surface, which in sequence can be placed in position for bearing and sliding against the hole wall by rotating the guide pad, on the one hand by rotating the guide pad in the median plane 12 and on the other hand be rotated around its longitudinal axis 8 to expose the other main surface towards the hole wall during drilling. The sliding surfaces are convexly curved as viewed in a plane perpendicular to the longitudinal axis, wherein the radius of curvature is equal to or smaller than the radius of curvature of the holes for which they are adapted to be used. In order to ensure that only one of the sliding surfaces 13 on each main surface of the guide pad is subjected to wear at a time, the guide pad is mounted to the cutter head with a small inclination of its longitudinal axis 8 in relation to a longitudinal axis 14 of the cutter head, as is illustrated in the longitudinal section of FIG. 4. In this way, a small gap 15 is established between the hole wall and the rear sliding surface of the guide pad and only the forward end of the forward sliding surface 13 is in contact with the hole wall.

During drilling by means of the drilling tool, cooling and lubricating fluid, such as oil, water or gas, is supplied to the bore hole 5, such that the fluid is brought to flow around the circumference of the cutter head 1, on the one hand for cooling and lubricating the cutting inserts 2 during cutting, but also for cooling and lubricating of the guide pads 6, which run a risk of being overheated with subsequent excess wear and crack formation due to the frictional heat generated as they bear and slide against the hole wall 7 during drilling. The cooling and lubricating fluid flows along essentially the entire circumference of the cutter head since only the sliding surfaces of the guide pads bear and slide against the hole wall such that a small gap 16 is formed between the rest of the cutter head and the hole wall, as is seen from the FIGS. 3 and 4.

However, there are also formed first and second cooling ducts 17 in the direction of the longitudinal axis 14 along the envelope surface of the cutter head to ensure a sufficient large flow of cooling and lubricating fluid to the cutting end. In order to enable subsequent discharge of the fluid together with the chips produced during drilling, the cutter head is provided with first and second openings 18 and an inner channel 19, which is in fluid communication with an inner bore of the drill tube. The first opening 18 is positioned in the area in front of the two cutting inserts 2 on the one side of the rotational axis, and the second opening in the area in front of the single cutting insert on the other side of the rotational axis.

During drilling operation with the cutter head, cooling and lubricating fluid is fed under pressure into the bore hole and flows along the outer periphery of the cutter head to the forward end of the cutter head at the bottom of the bore hole. The cooling and lubricating fluid flows inwards towards the rotational axis 14, passes by the cutting inserts 2 and washes away the chips and then flows into the first and second openings 18 and through the inner channel 19 and away from the cutter head. As is seen from FIGS. 2 and 3, the first and second cooling ducts 17 are, as seen in direction of rotation Rot, located in the area in front of the respective guide pads 6, which has to effect that plenty of cooling fluid is available in front of the guide pads and is forced into the contact zone between each guide pad and the hole wall during rotation.

In order to improve the cooling and lubricating of the guide pads, each pad is formed with a fluid conveying formation 20 in each sliding surface 13. The fluid conveying formation 20 has a longitudinal extension in a direction of the longitudinal axis 8, which in its turn is nearly parallel to the rotational axis 14 of the cutter head. Accordingly, each fluid conveying formation separates the associated sliding surface into two sliding sub-surfaces 13'.

The fluid conveying formation 20 is planar or has a convexly curved shape as viewed in a plane perpendicular to the longitudinal axis of the guide pad, and the fluid conveying formation has a larger radius of curvature than the sliding surface 13. The fluid conveying formation 20 is visible from the views and the longitudinal section in FIGS. 5-9 of an embodiment of a guide pad having a planar fluid conveying formation and is also illustrated in the schematic cross sections in FIG. 10, which illustrates a guide pad 6 having a planar fluid conveying formation 20. FIG. 11 shows a guide pad having a convexly curved fluid conveying formation 20 having a radius R2 being larger than the radius R1 of the adjoining sub-surfaces 13 forming the sliding surface 13.

Figure 10:
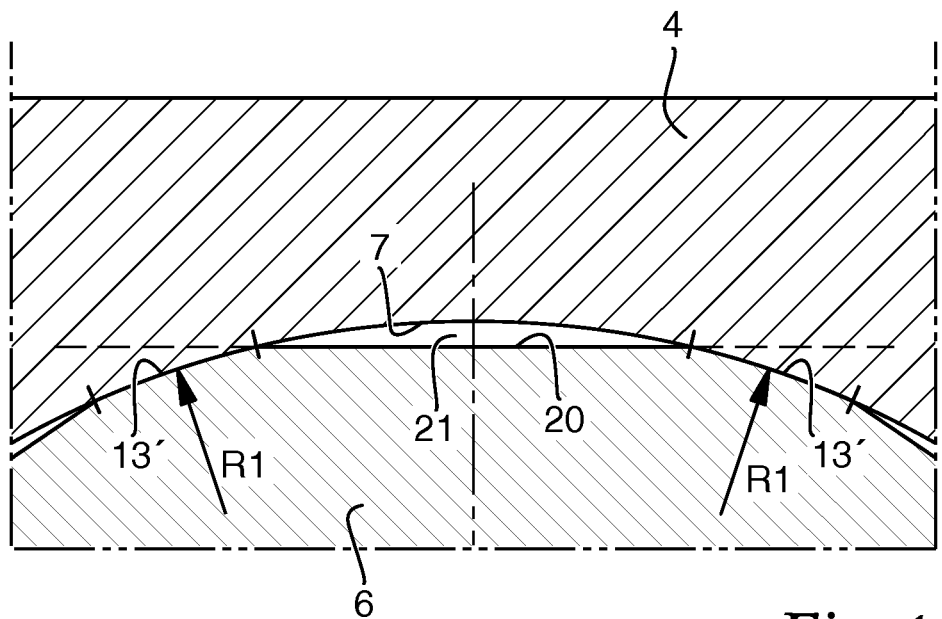
FIG. 10 is an enlarged cross-section through a portion of a guide pad, according to FIGS. 5-9, being positioned within a bore hole of a work piece during drilling of the hole.
Figure 11:
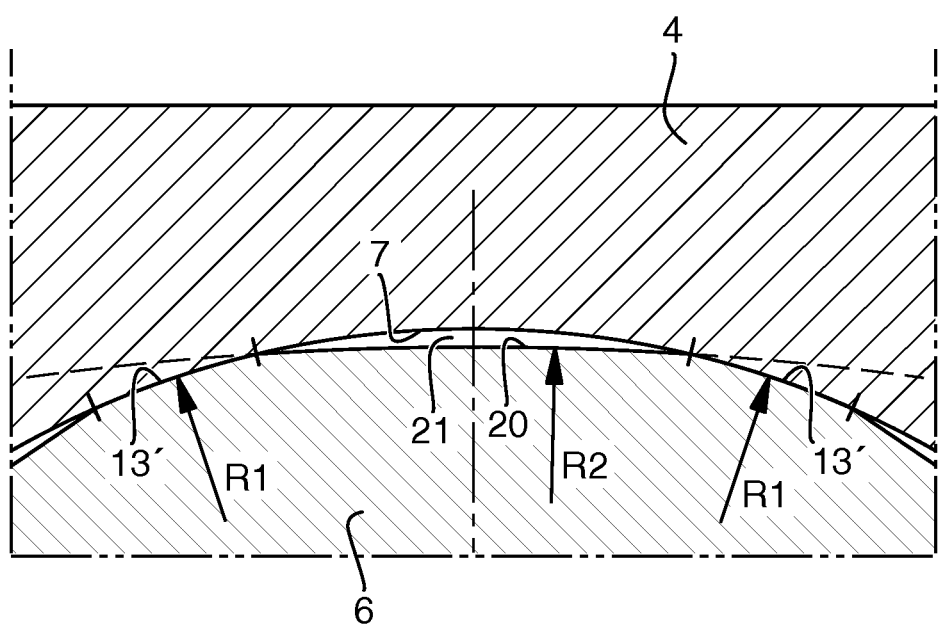
FIG. 11 is an enlarged cross-section according to FIG. 10 of a second embodiment of a guide pad according to the present disclosure.

The cross-sections of FIGS. 10 and 11 are shown with exaggerated radii R1 and R2 in order to more clearly illustrate the mutual relation between the sliding sub-surfaces 13 and the fluid conveying formation 20 of the guide pad and the hole wall 7 of the work piece 4. As is evident from the figures, due to the design of the guide pad, there will be formed a narrow gap 21 between the fluid conveying formation 20 and the hole wall 7 in which cooling and lubricating fluid can flow to the contact zone between the sliding sub-surfaces 13 and the hole wall 7 during rotation of the guide pad together with the cutter head. As the radii R1 and R2 are exaggerated in the figures, the gaps 21 between the fluid conveying formations and the hole wall will in reality be narrower than as illustrated but it is in most cases sufficient if the gap is at least about 0.1-0.05 mm at the front end of an unworn contact zone of the sliding surfaces to be able to convey sufficient amounts of cooling and lubricating fluid to the contact zone. Moreover, the fluid conveying formation 20 has a width that is smaller than half of the guide pad width. Thereby sufficient contact between the guide pad and the hole wall is ensured.

As shown in FIGS. 4, 5, 7 and 8, the guide pad has a somewhat smaller thickness in a middle portion 22 around a mounting hole 23 for a screw 24, as well as at the side surfaces 10 than at each end of the sliding surfaces 13 at the end surfaces 11. In this way it is easy for the cooling and lubricating fluid to flow in between the guide pad and the hole wall at the middle portion and then follow the fluid conveying formation 20 in the longitudinal direction of the guide pad towards the cutting end for cooling and lubricating the contact surface of each sliding sub-surface.

In order to facilitate insertion and retraction of the cutter head 1 into and out from a hole in a work piece, the ends of the guide pad are provided with first transition surfaces 32 between each sliding sub-surface 13 and the end surface 11 as well as a second transition surface 33 between the fluid conveying formation 20 and the end surface. The transition surfaces 32, 33 can be formed as chamfers, as is illustrated in the drawings, but could also have other shapes. For example be formed as a rounding off having a suitable radius. Accordingly, the guide pad will be somewhat tapered towards the end surface 11 and neither the sliding sub-surfaces 13 nor the fluid conveying formation 20 will extend all the way to the end surface.

When starting drilling with a fresh, unworn sliding sub-surface, the contact between the guide pad 6 and the hole wall will, due to the inclination of the guide pad in relation to the rotational axis 14, at first have the form of merely a small contact point, in the case the radii of the sub-surfaces are smaller than the radius of the hole, or as a curved line, in the case the radii of the sub-surfaces are equal to the radius of the hole. However, soon after being put into operation on a fresh sliding surface, the contact surface at each sub-surface 13 will start to propagate due to incipient wear of the guide pad and may after a while have the shape as is shown at the areas 25 (ruled with lines) of FIG. 6, as they might look in case the sliding sub-surfaces have a radius of curvature which is somewhat smaller than the radius of the bore hole.

The embodiments of the guide pad as disclosed herein are indexable four times by having two opposite main surfaces 9, each having two sliding surfaces 13 located in the respective end of the guide pad. One problem with a guide pad having sliding surfaces on opposite main surfaces is that when the sliding surfaces on a first main surface are worn out and the guide pad is turned to place a sliding surface on the opposite main surface in position for bearing and sliding against the hole wall, the sliding surfaces on the first main surface, which now have been deformed due to the wear, cannot serve as bearing surfaces for holding and supporting the guide pad in a correct position within close tolerances in relation to the cutter head.

Figure 12A:
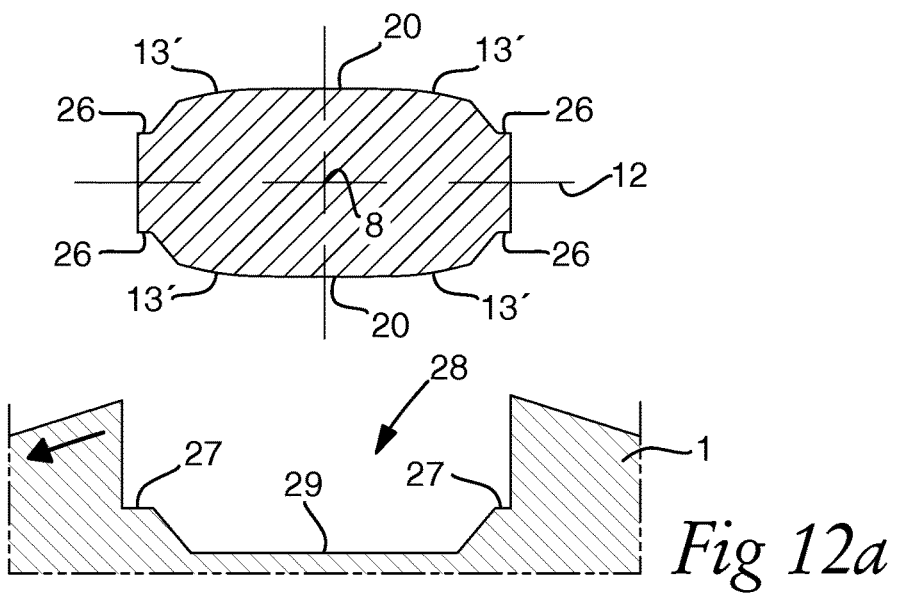
FIG. 12a is a cross-section of a guide pad and a seating portion of a cutter head in an disengaged stage.
Figure 12B:
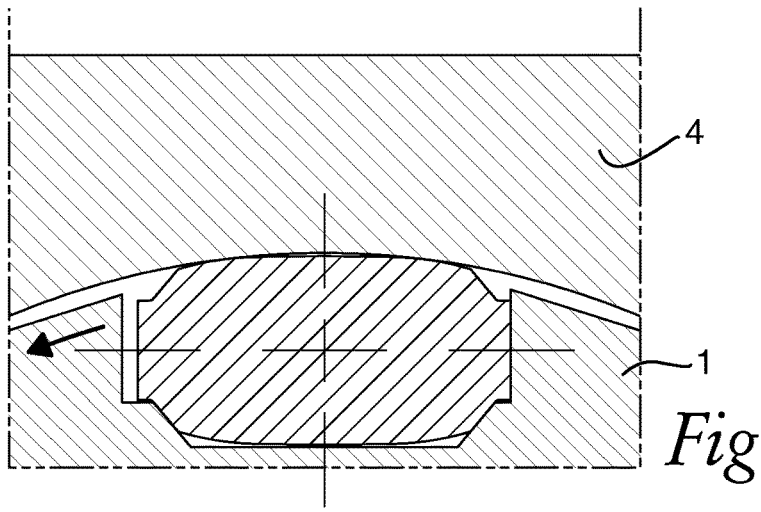
FIG. 12b is a cross-section according to FIG. 12a with the guide pad being mounted in the seating of the cutter head and bearing and sliding against a hole wall of a work piece during boring a hole in the same.

To overcome this problem, the guide pad is, as is best seen from FIGS. 12a and 12b, provided with two bearing surfaces 26, along each longitudinal side surface of the guide pad, which are located on a respective side of and facing away from the median plane 12 and having at least some extension in the direction in parallel to the longitudinal axis 8. The bearing surfaces 26 can extend along the whole longitudinal length or parts thereof, and have some extension close to the end of the guide pad for providing sufficient support to the sliding portion of the sliding surface 13 during drilling.

The bearing surfaces 26 and the surface of the fluid conveying formation 20 on the same side of the median plane 12, are moreover located between the median plane 12 and an imaginary circle arc having the smallest radius of curvature that simultaneously can tangentially contact an arbitrary contact point on each of the sliding sub-surfaces 13, i.e. a circle arc having the same tangent as the sliding sub-surfaces in the contact points. In other words, the bearing surfaces 26 and the surface of the fluid conveying formation are located within an imaginary arc circle that is in tangential contact with two arbitrary contact points on the sliding sub-surfaces 13', wherein one contact point is located on one respective sliding sub-surface. It is to be noted that in case the sliding sub-surfaces are part-circular and having the same center and radius of curvature, the imaginary circle arc will have the same radius of curvature as the sliding sub-surfaces.

Figure 14:
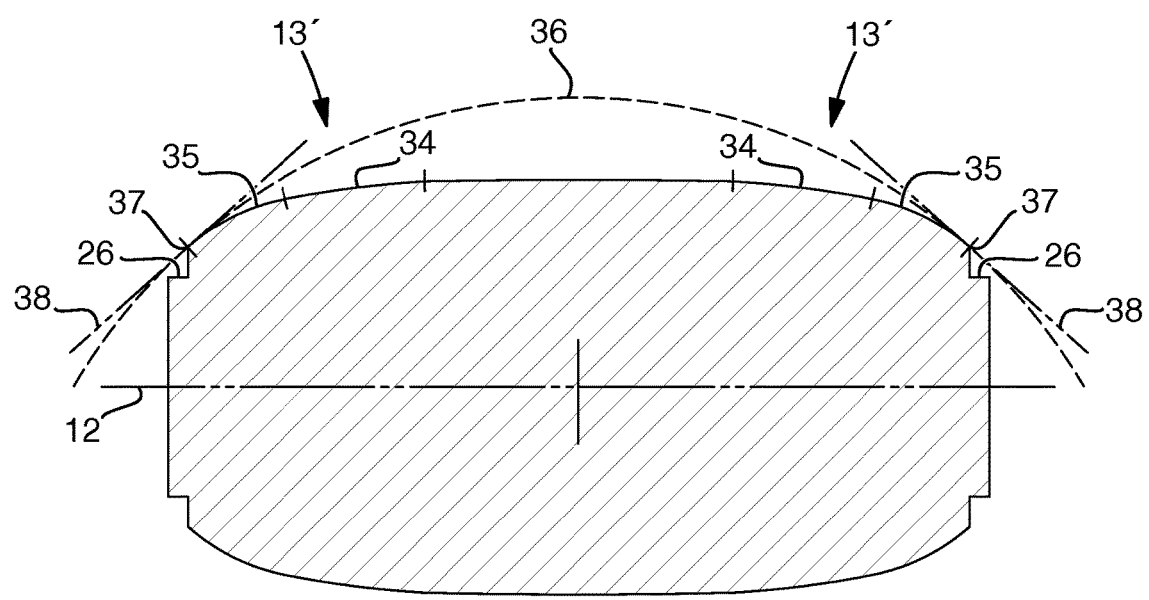
FIG. 14 is a cross-section through a guide pad illustrating the location of the bearing surfaces in relation to an imaginary circle and the median plane.

FIG. 14 illustrates an alternative embodiment in which each sliding sub-surface 13 is composed of two part-circular surfaces having different radii of curvature, i.e. an inner part-circular surface 34, with a comparatively large radius of curvature, and an outer part-circular surface 35 having a smaller radius of curvature. An imaginary circle arc 36 having the smallest radius of curvature that simultaneously can tangentially contact each of the sliding sub-surfaces 13 at arbitrary contact points 37 is illustrated in the figure. I.e. the imaginary circle arc 36 has the same tangent 38 as the part-circular surface at each contact point 37. As is evident from the drawing, the bearing surfaces 26 are located between the imaginary circle arc 36 and the median plane 12 and will accordingly be protected from wear when the sliding sub-surfaces on the same side of the median plane bear and slide against a hole wall of a work piece.

With a guide pad formed in this way it is no risk that the bearing surfaces 26 could be worn out through sliding against the hole wall when they are turned towards and facing the same. Accordingly, the guide pad can always be supported in a correct position along its longitudinal side surfaces against second support formations 27 along opposite longitudinal side surfaces of a seating 28 in form of a recess in the cutter head, which support formations mates with and bears against the bearing surfaces 26 at one side of the median plane 12 when the guide pad is mounted in the seating. Moreover, the guide pad can be supported in the middle along its longitudinal axis 8 by letting the fluid conveying formation 20 rest against a plane or otherwise suitably shaped bottom surface or first support formation 29 of the seating recess 28 for the guide pad, since also the fluid conveying formation 20 is protected against wear when it is turned towards the hole wall.

Figure 13:
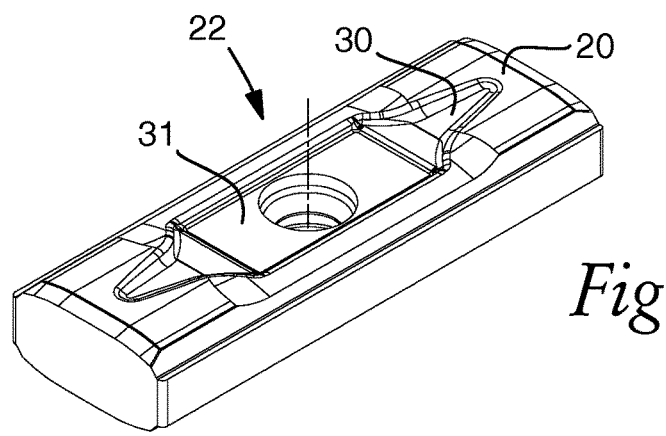
FIG. 13 is a perspective view of a third embodiment of a guide pad according to the present disclosure.

FIG. 13 illustrates an alternative embodiment of a guide pad by which each fluid conveying formation is formed as a combination of a planar fluid conveying surface 20 at the ends of the guide pad and a channel-shaped recess 30, which extends in the axial direction from a trough-formed recess 31 at the middle portion 22 of the guide pad and is terminated before reaching the end of the fluid conveying surface at the end of the guide pad. The channel-shaped recess 30 is formed with a large width at the middle portion and is tapering towards the end surface. With a fluid conveying formation formed in this way it is possible to convey a comparatively large amount of cooling and lubricating fluid to the contact zone between the guide pad and the hole wall.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A guide pad for a cutting tool arranged to form a bore in a workpiece, the guide pad comprising:
   at least one sliding surface convexly curved as viewed in a plane perpendicular to a longitudinal axis of the guide pad, each at least one sliding surface extending in a middle and in parallel to the longitudinal axis of the guide pad and is formed as a bevelling of the at least one sliding surface such that each at least one sliding surface is divided into two convexly curved sliding sub-surfaces; and
   a fluid conveying formation formed in each at least one sliding surface separating the sliding sub-surfaces arranged to receive cooling and lubricating fluid and having a longitudinal extension in a direction in parallel to the longitudinal axis, wherein the fluid conveying formation is planar or has a convexly curved shape as viewed in a plane perpendicular to the longitudinal axis and having a larger radius of curvature than a radius of the sliding surface, the fluid conveying formation having a width that is smaller than half of a width of the guide pad to receive the cooling and lubricating fluid, the fluid conveying formation being arranged to form a gap between the fluid conveying formation and a wall of the bore and having a fluid conveying capacity such that the cooling and lubricating fluid flows to a contact zone between the sliding sub-surfaces and the wall.

2. The guide pad according to claim 1, wherein the fluid conveying formation is smoothly merged with the sliding sub-surfaces.

3. The guide pad according to claim 1, further comprising two opposed symmetrically formed main surfaces.

4. The guide pad according to claim 3, further comprising two longitudinal side surfaces and four sliding surfaces, two of the sliding surfaces located on each main surface in sequence along the longitudinal axis.

5. The guide pad according to claim 4, further comprising two bearing surfaces, each disposed along a longitudinal side surface of the guide pad, each bearing surface being located on a respective side of and facing away from a median plane halfway between the main surfaces and having at least some extension in the direction of the longitudinal axis, wherein the bearing surfaces and a bottom surface of the fluid conveying formation at both sides of the median plane are located between the median plane and an imaginary circle arc having the smallest radius of curvature that simultaneously can tangentially contact each of the sub surfaces at arbitrary points.

6. The guide pad according to claim 1, wherein a channel-shaped recess is formed in the fluid conveying formation, the recess extending in the direction of the longitudinal axis from a middle portion of the guide pad and terminating before reaching the end of the sliding surface at an end surface of the guide pad.

7. The guide pad according to claim 6, wherein the guide pad has a smaller thickness in a middle portion than at the end of the sliding surfaces at its end surfaces.

8. The guide pad according to claim 6, wherein the guide pad is formed with a first transition surface between the sliding surface and the end surface such that the guide pad tapers towards the end surface.

9. The guide pad according to claim 8, wherein the guide pad is formed with a second transition surface between the fluid conveying formation and the end surface such that the guide pad tapers towards the end surface.

10. A cutter head for a drilling tool arranged to form a bore in a workpiece, the cutter head comprising:
- a guide pad, the guide pad including at least one sliding surface convexly curved as viewed in a plane perpendicular to a longitudinal axis of the guide pad, each at least one sliding surface extending in a middle and in parallel to the longitudinal axis of the guide pad and is formed as a bevelling of the sliding surface such that each at least one sliding surface is divided into two convexly curved sliding sub-surfaces; and
- a fluid conveying formation formed in each at least one sliding surface and separating the sliding sub-surfaces arranged to receive cooling and lubricating fluid and having a longitudinal extension in a direction in parallel to the longitudinal axis, wherein the fluid conveying formation is planar or has a convexly curved shape as viewed in a plane perpendicular to the longitudinal axis and has a larger radius of curvature than a radius of the sliding surface, the fluid conveying formation having a width that is smaller than half of a width of the guide pad to receive the cooling and lubricating fluid, the fluid conveying formation being arranged to form a gap between the fluid conveying formation and a wall of the bore and having a fluid conveying capacity such that the cooling and lubricating fluid flows to a contact zone between the sliding sub-surfaces and the wall.

11. The cutter head according to claim 10, wherein the guide pad is mounted to the cutter head with a small inclination of its longitudinal axis in relation to a longitudinal axis of the cutter head.

12. The cutter head according to claim 10, further comprising an envelope surface, the envelope surface including a cooling duct in the direction of the longitudinal axis, which, as seen in a direction of rotation of the cutter head, is located in an area in front of the guide pad.

* * * * *